United States Patent [19]

Faber, Jr.

[11] Patent Number: 4,852,714

[45] Date of Patent: Aug. 1, 1989

[54] ACCUMULATOR TABLE

[75] Inventor: Nicholas J. Faber, Jr., Raleigh, N.C.

[73] Assignee: Bristol-Myers Company, New York, N.Y.

[21] Appl. No.: 246,701

[22] Filed: Sep. 19, 1988

[51] Int. Cl.⁴ .............................................. B65G 1/00
[52] U.S. Cl. .................................. 198/347; 198/443; 198/455
[58] Field of Search ............... 198/347, 443, 453–455, 198/599, 636, 803.16

[56] References Cited

U.S. PATENT DOCUMENTS

| | | | |
|---|---|---|---|
| 2,629,481 | 2/1953 | Stover | 198/455 |
| 2,881,897 | 4/1959 | Thulke | 198/453 |
| 3,051,291 | 8/1962 | Hennessey | 198/453 |
| 3,357,536 | 12/1967 | Kelly | 198/454 |
| 3,640,373 | 2/1972 | Seragnoli | 198/443 |
| 4,815,580 | 3/1989 | Schanz et al. | 198/803.16 |

FOREIGN PATENT DOCUMENTS

| | | | |
|---|---|---|---|
| 647189 | 2/1979 | U.S.S.R. | 198/347 |
| 2030124 | 8/1980 | United Kingdom | 198/453 |

Primary Examiner—Joseph E. Valenza
Attorney, Agent, or Firm—Gene Warzecha

[57] ABSTRACT

An overflow or accumulator table for use with items to be processed to receive on its operating surface, and discharge therefrom, a plurality of containers or other items. The accumulator table is suitable for use with items being moved along a conveyor line. The accumulator table has a turntable surface and is capable of maximizing the number of containers or other items which may be supported on the turntable. A pair of spaced, spring-loaded, arcuate guiding members is supported above the turntable surface in a manner so as to occupy a negligible amount of space while providing a sufficiently strong, radially outwardly directed force to urge the containers or other items to the periphery of the turntable surface to assure that all items will be discharged therefrom.

6 Claims, 3 Drawing Sheets

ACCUMULATOR TABLE

BACKGROUND OF THE INVENTION

1. Field of the Invention

The invention relates generally to accessories for use with conveyor systems used to convey a plurality of containers or other items. More particularly, the invention relates to an accumulator table to receive and discharge containers or other items.

2. Description of the Prior Art

Accumulator tables have long been used with conveyor systems for assisting in maintaining the speed of the conveyor lines by serving as buffering mechanisms. An accumulator table may be loaded manually and then used to discharge its contents at a predetermined rate, or it may be loaded from an input conveyor and then discharge its contents onto an output conveyor. For example, packaging or other conveyor systems receive containers (or other items) from a source location and transport the containers to various locations along the line for further processing. The rate at which the containers are fed into the conveyor system is generally fairly constant although occasionally, because of a mismatch between the rate at which containers are fed into the system and the rate at which various processing operations occur, there may be too many containers at a given point in the processing line. The containers must then be temporarily diverted from the line onto one or more accumulator tables in order to prevent containers from blocking the conveyor line and allow the processing operation to catch up to the rate at which containers are fed into the system.

Generally, known accumulator tables each have a rotating turntable surface and do achieve the function of temporarily accumulating containers and discharging them appropriately as the system catches up and is able to accommodate the extra, accumulated containers. However, all of the known prior art accumulator tables are deficient in one respect or another. All known accumulator tables are inefficient because they are unable to store containers on their entire operating surface, generally because of some mechanical component or structural feature which takes up space on or above the rotating turntable surface of the accumulator table, thereby preventing the table from accumulating as many containers as it would normally do otherwise. Also, known accumulator tables are inefficient in discharging 100% of the accumulated containers. For example, one known turntable design utilizes a coiled flat piece of spring steel mounted from an overhead support above the turntable surface. The spring is coiled during the loading of the turntable and, as items are discharged from the turntable, the spring pushes the items towards the turntable periphery. As the periphery of the turntable gets congested as items are being accumulated, more and more infeed pressure is necessary to cause the items to push against the spring which is continually being coiled tighter. It has been found nearly impossible to produce a spring that can be fully compressed while also being able to completely uncoil in order to discharge all of the items from the turntable. This prevents the turntable from ever being completely filled if it is expected to also be completely emptied at any point in time.

Accordingly, it is an object of this invention to produce an accumulator table capable of maximizing the number of containers or other items which may be accumulated on its turntable surface and also being able to discharge all of the accumulated containers as needed.

SUMMARY OF THE INVENTION

These and other objects of the invention are achieved by the preferred embodiment of an accumulator table for use with items to be processed, said accumulator table comprising: a horizontal table surface; means for rotating said table surface in a predetermined direction about an axis perpendicular to said table surface; a substantially circular peripheral retaining member spaced above and generally parallel to said table surface, the axis of said circular retaining member being coincident with said axis of rotation of said table surface; a first elongated guide means spaced above and parallel to said table surface, said first guide means pivotable about a first axis parallel to said axis of rotation of said table surface and spaced a first predetermined distance therefrom; a second elongated guide means spaced above and parallel to said table surface, said second guide means pivotable about a second axis parallel to said axis of rotation of said table surface and spaced a second predetermined distance therefrom; and means for biasing said first and second guide means relative to their respective axes in a direction opposite said predetermined direction of rotation.

The invention may additionally be used within a conveyor line in which case the accumulator table as described above would be associated with an infeed means to enable transfer of items onto the table and an output means to enable discharge therefrom.

DESCRIPTION OF THE PREFERRED EMBODIMENT

Figure 1:
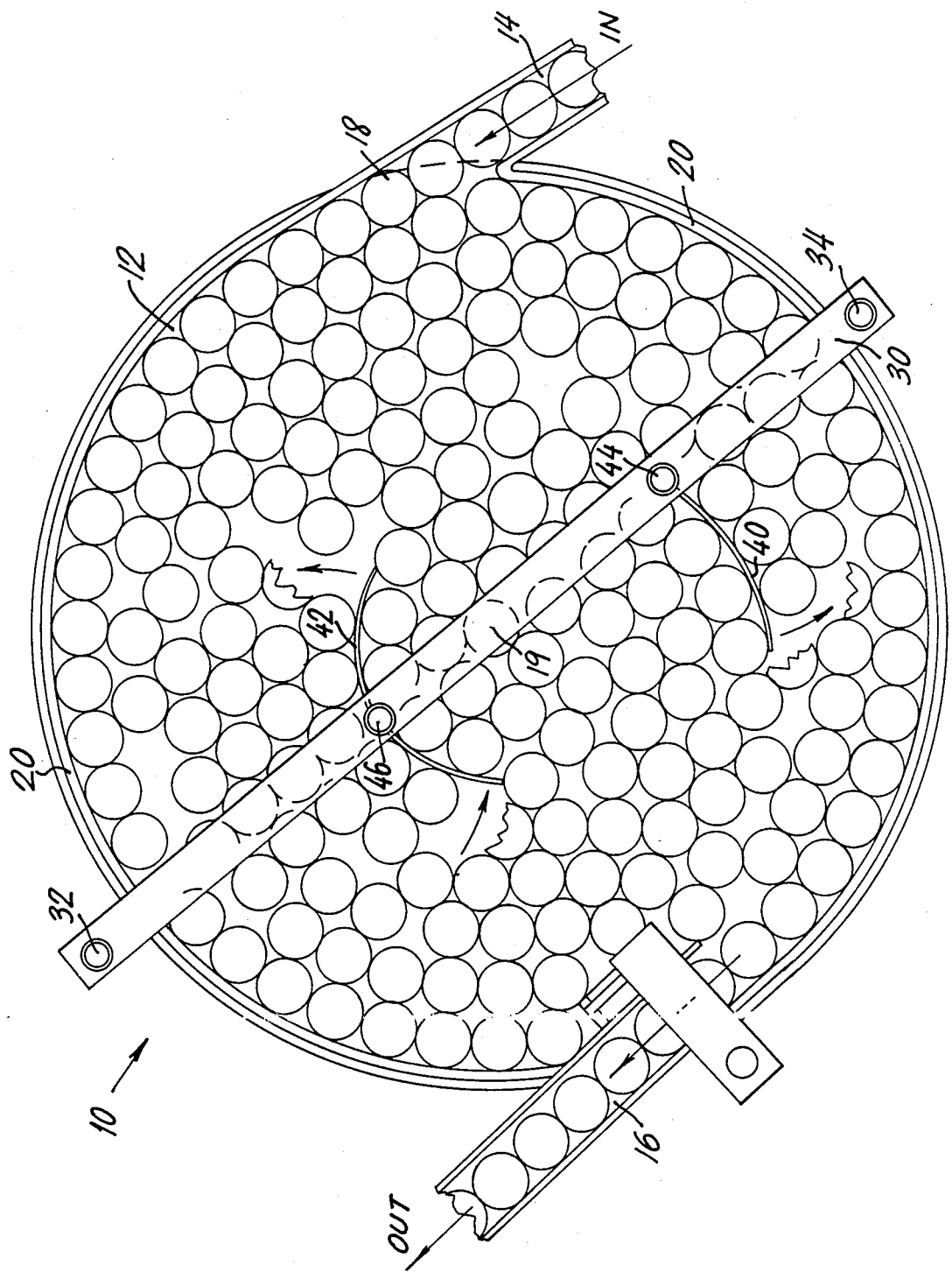
FIG. 1 is a schematic plan view of an accumulator table constructed in accordance with the principles of this invention, the table being shown as it may appear with its entire turntable surface substantially occupied by containers.

Referring now to FIG. 1, there is shown a plan view of an accumulator table 10 constructed in accordance with the principles of this invention, which table is substantially filled with items or containers 18.

Accumulator table 10 is associated with a processing system having a conveyor line (not shown) for performing some process on the containers 18. While containers 18 are, in the Figures, shown to be round, cylindrically shaped bottles, it will be understood that the invention is also operable with a variety of items of different shapes. Accumulator table 10 has a turntable surface 12 which is rotated clockwise about axis 19 by a motor (not shown). It will, of course, be understood that the table may rotate in either direction, provided, as will be understood below, other parts are adjusted accordingly. Inlet or infeed conveyor line 14 and oulet conveyor line 16 are associated with turntable 12 to feed containers 18 onto and discharge them from the turntable surface. Obviously, an infeed conveyor is not necessary and items may be placed manually on turntable 12. Also, an outlet conveyor is not necessary if items are discharged directly to a processing or other end location thereby obviating the need for a conveyor. Indeed, a situation may be envisioned where the accumulated items need not be actively discharged but merely passively discharged by being picked off the turntable surface as necessary, either manually or automatically. A peripheral retaining or guide means 20 is situated above and generally parallel to the turntable surface in order to retain containers 18 thereon. In the embodiment disclosed in the Figures, guide means 20 is adapted to guide the containers onto the turntable from infeed conveyor 14 and off the turntable onto output conveyor 16. If a particular environment is such that the items are to be manually loaded on to and then picked off the turntable, the guide means would be such as to retain the items over substantially 360°.

Figure 4:
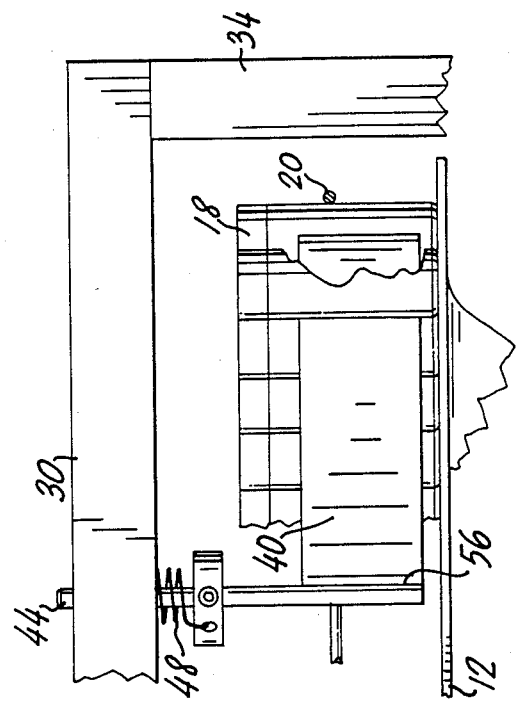
FIG. 4 is a view of FIG. 2 taken along lines 4—4.
Figure 3:
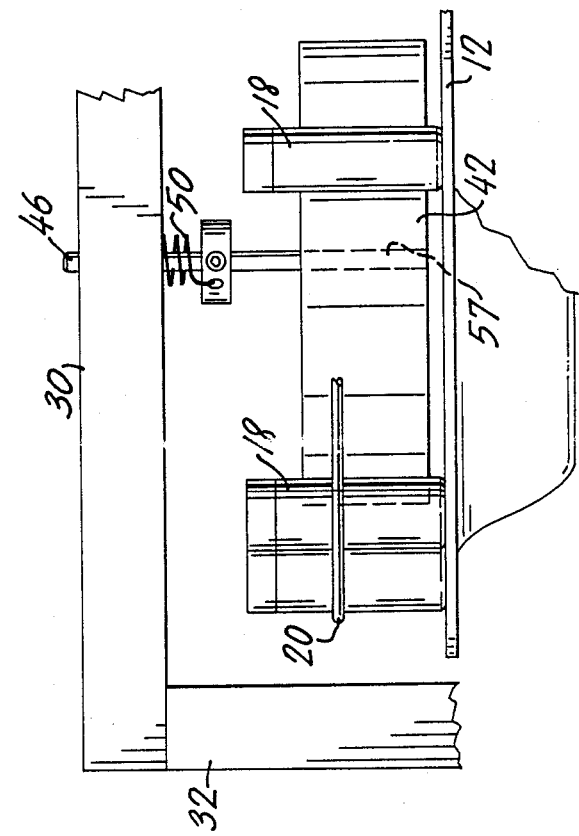
FIG. 3 is a view of FIG. 2 taken along lines 3—3.

Accumulator table 10 is provided with a diametrical support bar 30 spaced above turntable 12 by vertical support members 32 and 34. Support bar 30 holds a pair of guide members 40 and 42 via pivot pins 44 and 46, respectively. In the preferred embodiment, the guide members are rigid, thin, generally rectangular and formed into a predetermined curve so that each guide member has a convex and concave surface. The pins may either protrude through support bar 30, as shown in FIGS. 3 and 4, or may be otherwise retained to the support bar (not shown). In either event, each of the pins is provided with torsion spring means 48 and 50, respectively, in order to resiliently bias the associated guide member in a counterclockwise direction opposite to the clockwise direction of rotation of the turntable surface. Spring means 48 and 50 are sized according to the amount of friction between the turntable surface and the items on the surface. That is, the greater the friction the larger the spring.

Guide members 40 and 42 are curved in arcs having a radius of curvature which is a function of the diameter of the turntable and generally equal to the distance of the pivot pins 44 and 46, respectively, from axis 19 of the turntable. While the guide members are, in the preferred embodiment, elongated curved sheets of generally rectangular shape, many other arcuate members are also suitable, e.g. curved tubing, rods, etc. Indeed, even straight, uncurved guide members are suitable, however, to maximize the amount of usable turntable surface, the curvature should be such as to conform to the same curved path which the containers follow on the turntable. Straight guide members would enable full discharge of items from the turntable but would limit the total number of items which could be accumulated.

The guide member closest to infeed conveyor 14, i.e. guide member 40, is an arcuate structure extending only in one direction from pivot pin 44 which is located at one-half the turntable radius. In the preferred embodiment, guide member 40 has a length equal to one-half the radius. It has been found that this type of one-sided guide member arrangement facilitates placing a maximum number of containers 18 onto turntable 12. Guide member 42, on the other hand, is an arcuate structure having two halves 54A and 54B extending symmetrically from pivot pin 46 which is located at a point one-sixth of the diameter from axis 19. While the preferred embodiment utilizes a guide member 42 extending in opposite directions from pivot 46, such symmetrical construction is not absolutely essential but does enhance operating efficiency. In the symmetrical preferred embodiment, portion 54A urges items outwardly while portion 54B urges items inwardly. It will be understood that any items contacting the inner, concave side of portion 54B will, because of the rotation of turntable 12, be caused to follow the concave surface of 54B and 54A and eventually be pushed toward the turntable periphery. The length of guide member 42 is, in the preferred embodiment, one-third the turntable diameter plus 10% of the turntable diameter. The length is such that containers 18 are urged outwardly a sufficient amount to be intercepted by guide member 40 which further urges these containers radially outwardly to place them on the outer periphery of turntable 12. This action properly places the containers so they may be discharged onto output conveyor 16. During the time the turntable is being loaded, portion 54B of guide member 42 helps to maintain the containers radially inwardly of guide member 42 by placing them at a point on the turntable 12 where the containers will rotate about axis 19 in increasingly smaller circles until substantially the entire surface of turntable 12 is occupied by containers.

Each of the guide members 40 and 42 is a relatively thin structure as best seen in the plan view of FIG. 1, and has a predetermined height, as best seen in the elevational views of FIGS. 3 and 4. The thinness of the guiding members enables them to properly orient the containers 18 without occupying an inordinate amount of space which would preclude maximization of the number of containers which could occupy the turntable surface. The height is sufficient to enable the guide members to laterally move containers 18 along the turntable surface without causing them to topple over.

In operation, it is noted that as containers 18 are fed onto table 10 they will eventually impinge against the outer, convex surfaces 52 and 53, respectively, of guide members 40 and 42. Because these members are biased and the surfaces are curved as shown, guide members 40 and 42 will urge containers 18 radially outwardly and will not impede the passage of the containers. Eventually, with enough containers on turntable 12, guide members 40 and 42 will be urged clockwise against springs 48 and 50, respectively, to the positions shown in FIG. 1 wherein they are aligned generally along arcs having a predetermined radius from turntable axis 19. It is thus seen that the space taken up by arcuate guide members 40 and 42 on the turntable is very small and relatively insubstantial compared to the space of the containers themselves. As best seen in FIG. 4, the guide members are each attached to their respective axial pin along welded seams 56 and 57, or similar structures, such that the volume taken up by the combination guide member and axial pin is still very small.

Figure 2:
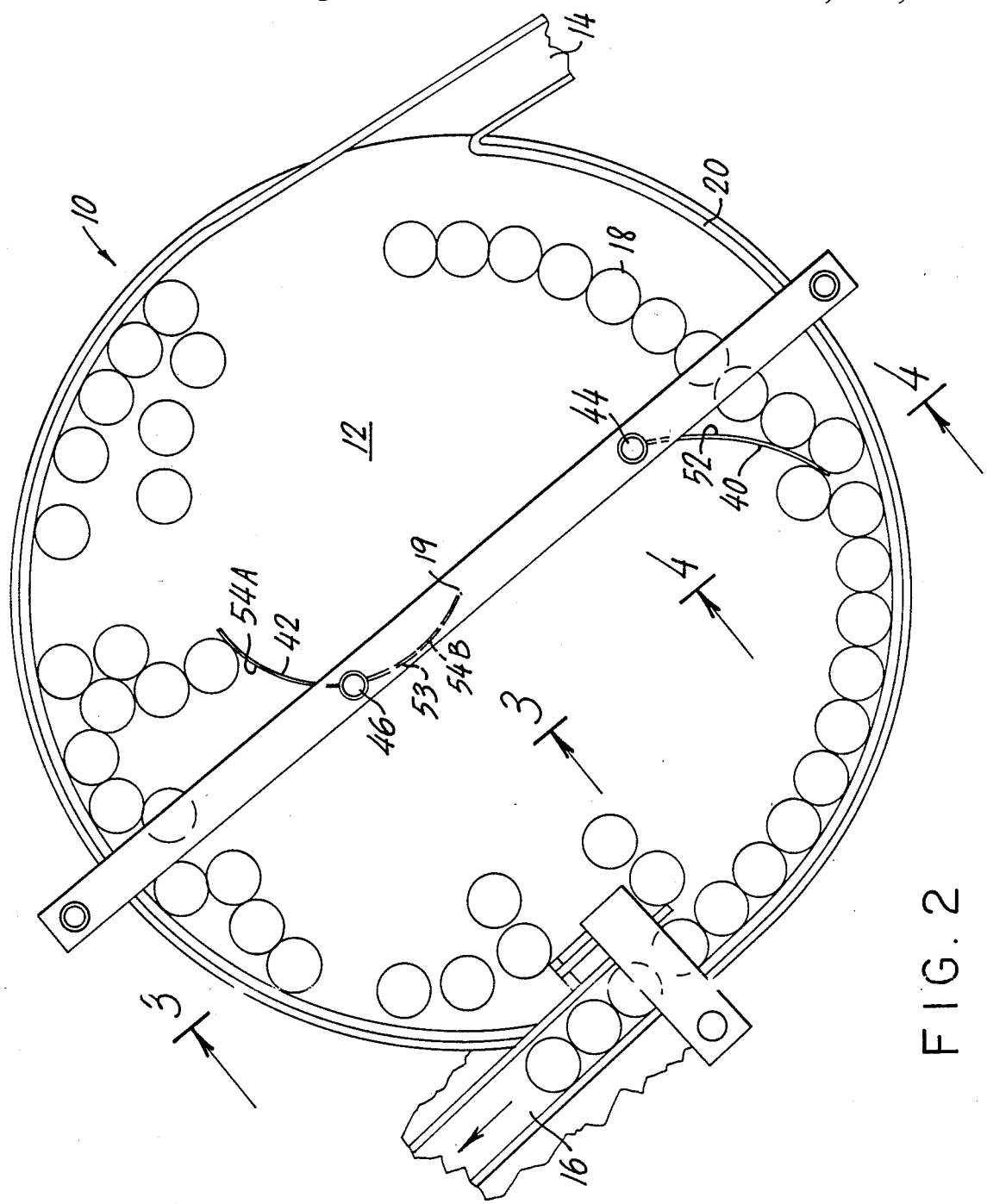
FIG. 2 is a schematic plan view of the accumulator table of FIG. 1 in a partially emptied state.

As best seen in FIG. 2, in a discharge mode turntable 12 rotates clockwise with no incoming containers. Actually the operation of accumulator table 10 would be similar even if containers were being simultaneously fed onto the turntable from infeed conveyor 14. As turntable 12 rotates clockwise, the containers 18 that happen to be spaced inwardly from guide 20 (i.e., more than the distance of one container diameter) will eventually hit the convex surface 52 or 53 of guide members 40 and 42. Those containers that do so contact surface 53 of guide member 42 are urged radially outwardly a predetermined amount, depending upon how many other containers 18 are interposed between the guide 20 and surface 53. Eventually, all containers will be urged outwardly by guide 40 into a position such that guide 42 is then able to urge these containers into eventual contact with the inner radial surface of peripheral guide 20. Output conveyor 16 is tangential to the periphery of turntable 12 in order to receive all containers 18 which have been urged against guide 20. It is thus seen that all containers will eventually be emptied from the turntable surface. It will be understood by those skilled in the art that other infeed and discharge orientations are feasible.

It should be noted that the preferred embodiment of the invention utilizes two guide members. However, in certain applications where items of light weight are to be accumulated, one guide member similar to member 42 will operate satisfactorily. There is a significant friction differential between the items situated at various portions of the turntable. Those near the periphery are moving faster relative to the items at the center portion of the turntable and, therefore, require a greater force to overcome friction between them and the turntable surface. The use of two guide members insures that a sufficient amount of outwardly directed radial force will be applied to the containers to overcome any friction which may tend to keep them at a certain point on the turntable. Indeed, there may be some applications where more than two guide members are desirable.

It will be understood by those skilled in the art that numerous modifications and improvements may be made to the preferred embodiment of the invention disclosed herein without departing from the spirit and scope thereof. For example, while the preferred embodiment is described as operating on containers, it should be understood that the invention is equally suitable for many other items where there is a need or desire to accumulate the items for a period of time. It should also be understood that an accumulator table constructed in accordance with the principles of this invention may, when loaded manually, be used separately from any infeed or output conveyors. That is, the items could be discharged to a location where they could be processed without being transported by a conveyor line.

What is claimed is:

1. An accumulator table for use with items to be processed, said accumulator table comprising:
   a horizontal table surface;
   means for rotating said table surface in a predetermined direction about an axis perpendicular to said table surface;
   a substantially circular peripheral retaining member spaced above and generally parallel to said table surface, the axis of said circular retaining member being coincident with said axis of rotation of said table surface;
   a first elongated guide means spaced above and parallel to said table surface, said first guide means pivotable about a first axis parallel to said axis of rotation of said table surface and spaced a first predetermined distance therefrom;
   a second elongated guide means spaced above and parallel to said table surface, said second guide means pivotable about a second axis parallel to said axis of rotation of said table surface and spaced a second predetermined distance therefrom; and
   means for biasing said first and second guide means relative to their respective axes in a direction opposite said predetermined direction of rotation.

2. An accumulator table according to claim 1 further comprising:
   output means associated with said circular retaining member enabling said items to be discharged from said table surface.

3. An accumulator table according to claim 1 wherein said conveyor line is associated with an infeed conveyor for moving said items onto said accumulator table and further comprising:
   infeed means associated with said circular retaining member for enabling said items to be transferred from said input conveyor onto said table surface.

4. An accumulator table according to claim 1 wherein said first and second elongated guide means further comprise first and second arcuate guiding members, respectively, each having a radius of curvature substantially equal to the distance of their respective first and second pivot axes from said axis of rotation of said table surface.

5. An accumulator table according to claim 1 further comprising said first and second pivot axes of said guide means being spaced from each other at diametrically opposed first and second points, respectively.

6. An accumulator table according to claim 4 wherein one of said first or second elongated guide members is secured to its respective pivot axis at substantially its mid-point.

* * * * *